Feb. 2, 1965     B. BARÉNYI     3,168,344
AUTOMOBILE COWLING
Filed Nov. 14, 1961     3 Sheets-Sheet 1
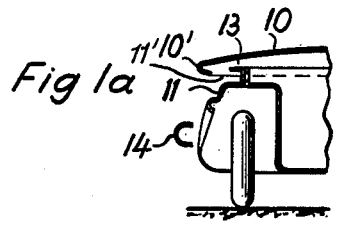
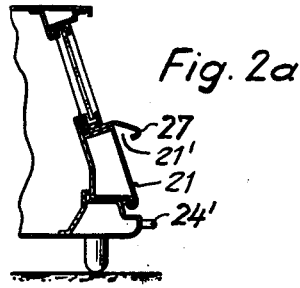
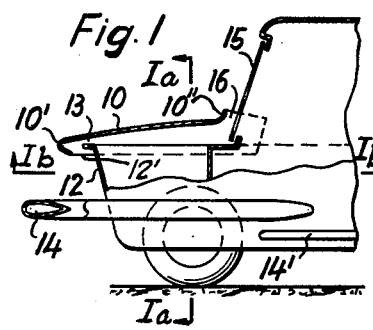
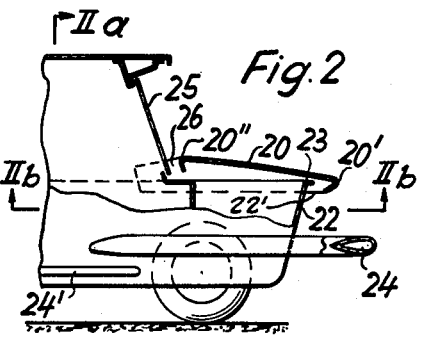
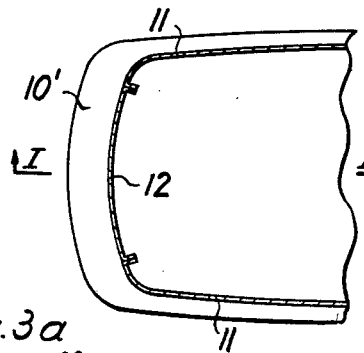
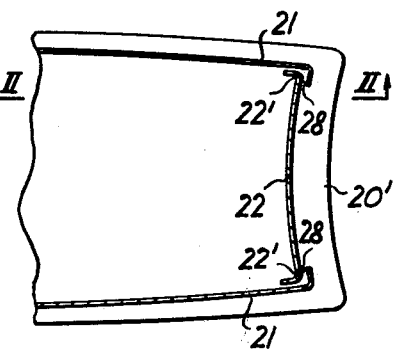
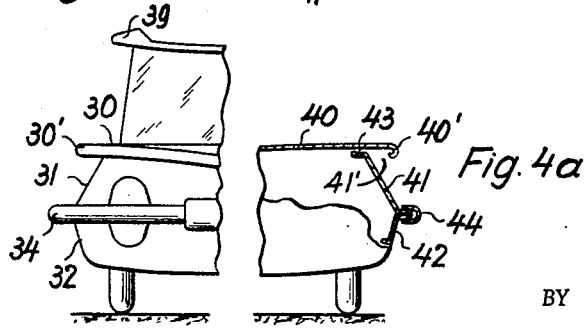
INVENTOR
BELA BARÉNYI
BY Dicke and Craig
ATTORNEYS

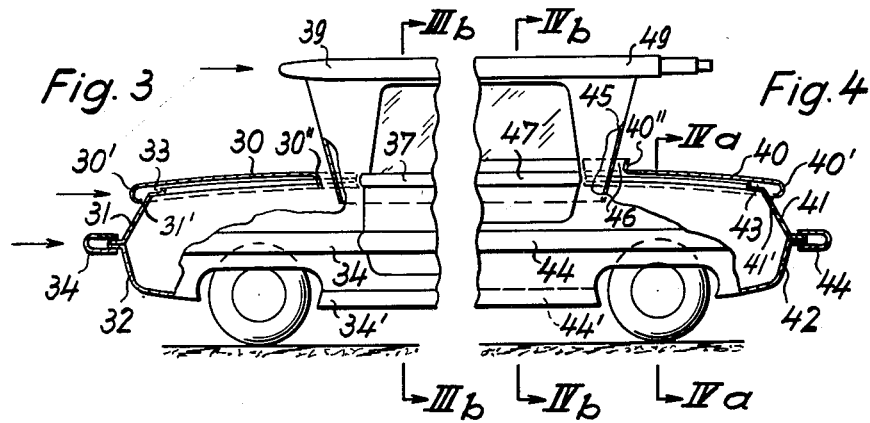
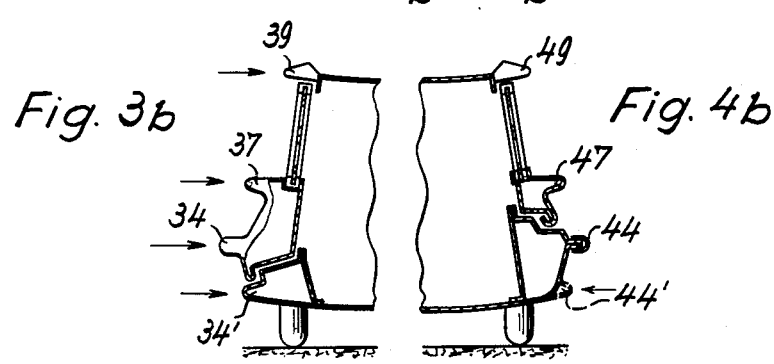
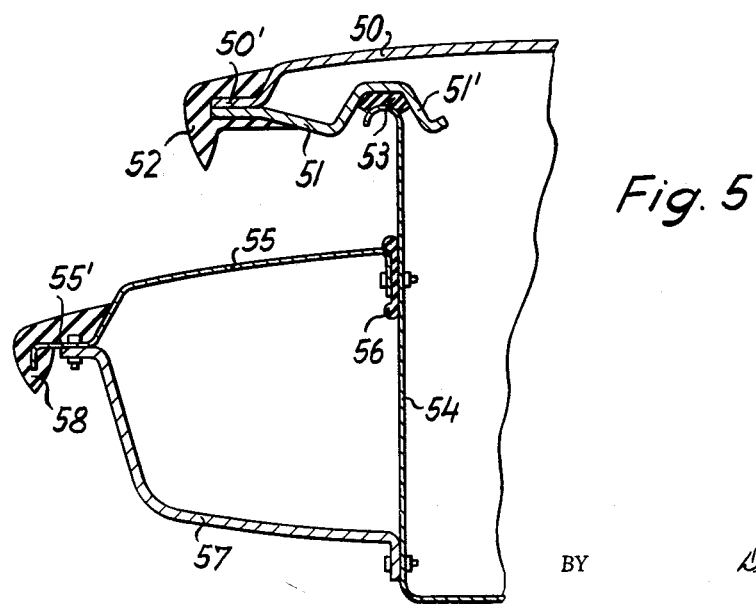

Feb. 2, 1965  B. BARÉNYI  3,168,344
AUTOMOBILE COWLING
Filed Nov. 14, 1961  3 Sheets-Sheet 3
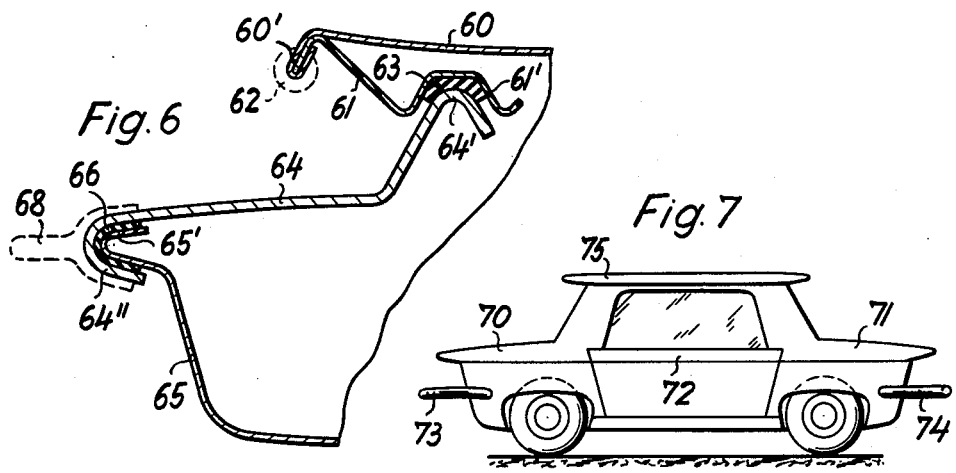
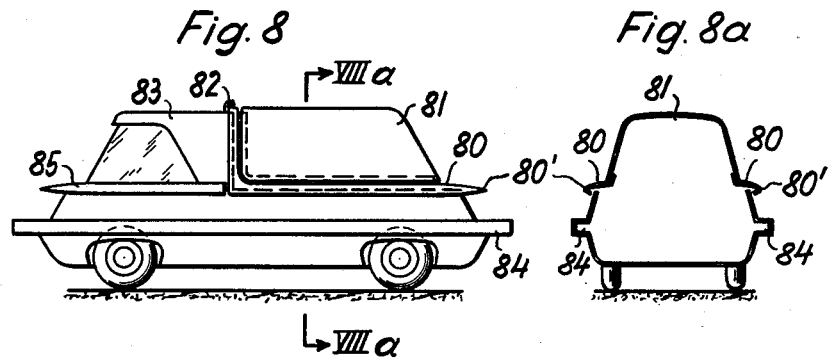
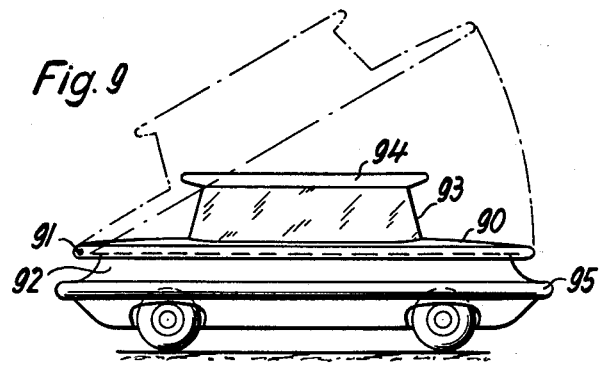
INVENTOR
BELA BARÉNYI
BY Dicke and Craig
ATTORNEYS

United States Patent Office 3,168,344
Patented Feb. 2, 1965

3,168,344
AUTOMOBILE COWLING
Béla Barényi, Stuttgart-Vaihingen, Germany, assignor to Daimler-Benz Aktiengesellschaft, Stuttgart-Unterturkheim, Germany
Filed Nov. 14, 1961, Ser. No. 152,307
Claims priority, application Germany Nov. 15, 1960
3 Claims. (Cl. 296—28)

The present invention relates to the cowling of an automobile including a movable hood for the engine or baggage compartment which extends over the entire width of the car.

It is already known with regard to car bodies to provide hoods with downwardly drawn wall portions which are in alignment with the cowling parts of the car below the hood or adjoin the same by forming an intermediate angle. The sealing means for such hoods are preferably arranged so as to be covered by the downwardly drawn wall portions of the hood. Although various improvements have been proposed to simplify the design and installation of these known hoods so that the width of the joint between the edges of the hood and the adjacent cowling parts no longer critically affects the appearance of the car, it is still necessary to make adequate provisions to insure that the edges of the hood extend exactly parallel to the edges of the adjacent cowling parts so that these joints will have a uniform width along their entire length and will thus not give the car an ungainly appearance.

It is an object of the present invention to overcome these disadvantages of the cowling parts of prior cars and to provide an arrangement in which there is no longer a noticeable joint or gap between the edge portion of the hood and the adjacent cowling parts, so that the hood may be made with considerable manufacturing tolerances and does not have to be installed in an accurate position relative to the adjacent cowling parts.

The invention consists essentially in designing the hood and the adjacent cowling parts of the car so that the outer edges of the plane or only slightly arched hood project along their entire length over the adjacent cowling parts, such as fenders, end walls, and the like, and lie at least substantially within one plane. The projecting outer edge portions of the hood then cover up completely the joints between the hood and the adjacent lower cowling parts which then no longer visibly abut against the edge portions of the hood. This is true especially if, according to a preferred feature of the invention, the joints are located closely underneath the upper surface of the hood.

In order to improve the connection of the respective hood to the adjacent front or rear window of the car, the inner edge of the hood preferably adjoins the adjacent window of the passenger compartment by forming an intermediate wide gap of a uniform width or of a sickle-like shape. This permits the hood to be freely shifted during the installation relative to the other parts of the cowling of the car.

In a car the cowling of which is provided with an end wall, the invention further provides the feature that the fenders of the wheels underneath the hood project over the edges of the associated end wall and form an intermediate longitudinal gap, and cover up these edges, as seen from the front or rear of the car, respectively. In place of this it is, however, also possible to construct the lateral cowling parts and the front or rear parts which are located underneath the hood so as to form a continuous cover plate and the outer edges of the hood so as to extend substantially parallel to the contours of this cover plate.

For protecting the edge portions of the hood, it is advisable to provide protective or bumper strips which project at all sides beyond the edge portions of the hood and are located approximately at the middle of the height of the lower part of the car. Furthermore, in order to improve the aerodynamic conditions of the car, the bulges which are formed on the hoods by the projecting edge portions may be continued by additional bulges on other cowling parts along the entire length of the car. Additional bulges may also be provided according to the invention on the lower part of the car and/or on the edge of the car top. These bulges preferably extend within horizontal planes and along and around the entire car. They are also provided to improve the aerodynamic conditions of the car and may also form or be formed by the edge portions of the cowling parts which are provided at the middle of the height of the lower part of the car and which divert from each other in a trapezoidal shape, as seen in cross and longitudinal sections. Finally, the hood may also extend along the entire length of the car and form a single unit with the wall of the passenger compartment which may then be tilted upwardly about a longitudinal or transverse axis to permit persons to enter or alight from the car.

The objects, features, and advantages of the present invention will become more clearly apparent from the following detailed description, particularly when read with reference to the accompanying diagrammatic drawings, in which—

FIGURE 1 shows a side view of a part of a passenger car according to the invention, partly in a section taken along line I—I of FIGURE 1b;

FIGURES 1a and 1b show sections taken along lines Ia—Ia and Ib—Ib, respectively, of FIGURE 1;

FIGURE 2 shows a side view of a part of a car according to a modification of the invention, partly in a section taken along line II—II of FIGURE 2b;

FIGURES 2a and 2b show sections taken along lines IIa—IIa and IIb—IIb, respectively, of FIGURE 2;

FIGURE 3 shows a side view, partly in section, of a part of a car according to another modification of the invention;

FIGURE 3a shows a front view of a part of the car according to FIGURE 3;

FIGURE 3b shows a section taken along line IIIb—IIIb of FIGURE 3;

FIGURE 4 shows a side view, partly in section of a car according to a further modification of the invention;

FIGURES 4a and 4b show sections taken along line IVa—IVa and IVb—IVb, respectively, of FIGURE 4;

FIGURE 5 shows an enlarged cross section of the cowling of a car according to a further modification of the invention;

FIGURE 6 shows an enlarged cross section of the cowling of a car according to a further modification of the invention;

FIGURE 7 shows a side view of a car which is provided with a cowling according to the invention;

FIGURE 8 shows a side view of a car of a different shape with a cowling according to the invention;

FIGURE 8a shows a cross section taken along line VIIIa—VIIIa of FIGURE 8; while

FIGURE 9 shows a side view of a further car with a cowling according to the invention.

As diagrammatically illustrated in FIGURES 1, 1a, and 1b, the front part of a passenger car is provided with a hood 10 of a full width pivotable about a substantially horizontal rectilinear axis and which has a slight convex curvature toward the outside. The outer edge portions 10' of this hood project along their entire length beyond the cowling parts 11 and 12 underneath the hood. The joints 13 between hood 10 and the lower cowling parts 11 and 12 are disposed closely underneath the upper surface of hood 10 and are covered by the projecting edge portions 10' of the hood and are thus not noticeable from the outside. This advantageous effect is still further improved by the fact that the edge portions 10' of the hood are bent inwardly and their free edge is disposed slightly lower than joint 13. The edge portion 10' of hood 10 lies within a plane and extends substantially parallel to the cowling parts 11 and 12 which in this particular embodiment are combined to form one continuous cover plate. As shown in FIGURES 1 and 1a, the terminal edge of edge portion 10' and the adjacent sides of cowling parts 11 and 12 define gaps 11' and 12' which are of such width that any width variation due to manufacturing tolerances cannot be perceived with the naked eye. For protecting the edges 10' of the hood, a bumper strip 14 is mounted on the lower part of the car approximately at the middle of the height of this lower part and so as to project at all sides beyond the edge portions of the hood. This bumper 14 is continued by a strip 14' on the doors of the car. The inner edge 10" of hood 10 which faces toward the front or rear window 15 is bent slightly upwardly and forms a wide gap 16 between it and windshield 15.

Hood 20 of the modification according to FIGURES 2, 2a, and 2b is designed similarly as described above, and it is also of a slightly convex shape and its outer edge portion 20' also projects beyond the cowling parts 21 and 22 and is then bent over inwardly to form gaps 21' and 22' similar in formation and purpose to the gaps 11' and 12' of FIGURES 1 and 1a. For protecting the edge portion 20' which covers up the gap 23 between hood 20 and the cowling parts 21 and 22, there is also in this case a bumper 24 provided which is continued at the door by a strip 24'. Not only the outer edge portion 20' but also the edge portion 20" of the hood 20 which faces toward the front or rear window 25 is bent over inwardly and forms a gap 26 between it and the windshield 25. The outer edges 20' of hood 20 again extend within a plane parallel to the outer cowling parts 21 and 22. Cowling parts 21 form fenders, while the cowling part 22 forms an end wall. The bulges formed by the bent-over edge portions 20' of hood 20 are continued by the parts 27 on the doors along the entire length of the car. As seen from the front of the car, fenders 21 extend over and cover up the edge portions 22' of the end wall and form an intermediate longitudinal slot 28. In this manner also the gaps between fenders 21 and end wall 22 are hardly noticeable and therefore of no disadvantage.

Although hood 30 according to the embodiment of the invention as illustrated in FIGURES 3, 3a, and 3b is similar to the hood as shown in FIGURES 2 to 2b, it is still flatter and ascending from the center toward the outside. The outer edge portions 30' and the inner edge portion 30" are again bent inwardly. The outer edge portion 30' projects beyond the cowling part 31 directly underneath hood 30 and it covers up gap 33 which is located directly underneath the surface of the hood. As best illustrated in FIGURE 3, the lower cowling parts 31 are so spaced from the vertical planes containing the terminal edges of outer edge portions 30' that the gaps 31' between parts 31 and such terminal edges are not visible to the naked eye. This gap or recess 33 also contains the sealing means for hood 30. For protecting the edges of the hood, a bulge 34 is again provided at one half of the height of the lower part of the vehicle which extends in this embodiment completely around the vehicle. This bulge 34 is formed by a strip which surrounds the edge portions of cowling parts 31 and 32 which divert from each other in a trapezoidal shape, as seen in cross and longitudinal sections. On the lower part of the car body, a further bulge 34' is provided between the wheels. Furthermore, the bulge which is formed by the edge portions 30' of the hood is also continued on the doors by a bulge 37. Finally, there is still another bulge 39 on the edge of the top of the car. All of these bulges serve as air conductors to stabilize the car.

In the embodiment of the invention as shown in FIGURES 4 to 4b, hood 40 is again curved slightly convex toward the outside, but it ascends from a center line toward the sides. While the outer edge portions 40' of the hood are bent inwardly, the inner edge portion 40" facing toward the windshield 45 is bent upwardly so that between this edge portion 40" and the front or rear window 45 a wide gap 46 is formed which may be either of a uniform width or sickle-shaped. Edge portion 40' again covers up gap 43 between hood 40 and the adjoining cowling part 41 and forms gaps 41' similar in function and formation to gaps 31' shown in FIGURE 3, and the upper edge portion of cowling part 41 again carries the sealing means for hood 40. The lower edge portion of cowling part 41 is connected to the cowling part 42, and both parts divert outwardly from each other, as seen in cross and longitudinal sections. The adjoining edges of parts 41 and 42 are covered by a protective or bumper strip 44 which extends entirely around the lower part of the vehicle. A further protective strip 44' may be provided on the lower edge portion of cowling part 42 between the wheels, and the edge of the car top is also provided with a bulge 49.

Further details of the inventive construction of the cowling of a car body will be apparent from FIGURES 5 and 6. According to the embodiment of the invention as shown in FIGURE 5, the edge portion of the convexly curved hood 50 is not bent inwardly but provided with a molded frame 51. Along its edge portion 50', hood 50 is secured to frame 51 by welding, riveting, or the like. The relatively sharp edge 50' is preferably covered by a layer 52 of elastic material, such as rubber, plastic, or the like, which also serves as a protection against impacts. Frame 51 is bent so as to have near its free edge a recess 51' of a trapezoidal cross section in which an elastic sealing member 53 may be inserted and secured, for example, by cementing. When the hood is closed, this sealing member 53 lies on the upper edge of the cowling part 54 which may also form the inner wall of the baggage or engine compartment. On the outer surface of cowling part 54 approximately at one half of the height of the lower part of the car, an outwardly projecting plate 55 is secured, for example, by being bolted thereto and to an intermediate sealing member 56. The outer edge portion 55' of this plate 55 which projects outwardly beyond the edge portion 50' of hood 50 is secured to another angularly bent plate 57 which is likewise secured to the cowling part 54 so that plates 54 and 55 together form a hollow chamber. The edge portion 55' of plate 55 is also provided with a protective layer 58 of elastic material. Plates 55 and 57 are intended to serve as distortable shock absorbers and the chamber enclosed by plates 54, 55, and 57 as a shock-absorbing chamber.

In the embodiment of the invention as shown in FIGURE 6, hood 60 has a concave curvature, and along its edge portion 60' it is bent around and thus secured to the edge portion of a molded frame 61 which, similarly as in FIGURE 5, has a recess 61' in which a sealing member 63 is mounted. The edge portion 60' may also be provided with an elastic covering 62, as indicated in dotted lines. Sealing member 63 rests on the upwardly bent end portion 64' of a cowling part 64 which projects far outwardly beyond hood 60. On its outer end portion 64", cowling part 64 is bent over and clamped to a lower cowling part 65, and between the connected portions an elastic sealing member 66 is inserted. The projecting edge portions 64" of cowling part 64 may also be covered by a protective buffer strip 68 of elastic material.

FIGURE 7 illustrates a passenger car which is provided with similar hoods 70 and 71 according to the invention at the front and rear of the car. The bulge which is formed by the edge portions of each hood is continued along the doors by a bulge 72. The front and rear ends of the car are provided with bumpers 73 and 74. For improving the aerodynamic properties of the car, a projecting bulge 75 is also provided along the edge of the car top.

In the further embodiment of the invention as illustrated in FIGURES 8 and 8a, the hood 80 is connected to a part of the car top 81 which is pivotably connected at 82 to the front part 83 of the car. Hood 80 together with the top 81 may be tilted upwardly about a transverse axis 82 for getting into or out of the car and for loading or unloading the same. Approximately at one half of the height of the lower part of the car, a bumper strip 84 is provided which projects beyond the edge 80' of the hood and extends around the entire car so as to protect the same at all sides.

FIGURE 9 finally shows a car in which the hood 90 extends over the entire car and is pivotably connected at one end to the lower part 92 of the car. The upper part 93 of the car which has a top 94 projecting at all sides is rigidly secured to hood 90. For getting into or out of the car or for loading or unloading the same, the entire upper part 93 including hood 90 and top 94 is tilted about the axis 91 to the position as indicated in dot-and-dash lines. Underneath hood 90, the lower part of the car is again provided with a bumper strip 95 which extends all around the car and projects beyond all of the other parts thereof.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a motor vehicle comprising a hood pivotable about a substantially horizontal, rectilinear axis, and further comprising lower cowling parts; said hood extending over the full width of the vehicle, said lower cowling parts being disposed underneath said hood, said lower cowling parts including portions extending longitudinally of said vehicle and further portions extending transversely of said vehicle, said first-named and second-named portions terminating in substantially horizontal upper flange portions, joints between the underside of said hood and said horizontal flange portions, said hood having outer edge portions disposed in a single plane and projecting along their entire length outwardly beyond said flange portions, said outer edge portions comprising further portions extending downwardly and inwardly toward the outer sides of said cowling parts, said further portions being disposed in positions lateral of said joints and being effective to shield said joints from end and side views, said further portions comprising terminal edges laterally spaced from said outer sides and terminating at a level below said flange portions and spaced therefrom when said hood is in closed position.

2. In a motor vehicle according to claim 1, wherein the gaps defined by said terminal edges and said outer sides are of such a great width that variations in such width due to manufacturing tolerances cannot be perceived with the naked eye.

3. In a motor vehicle according to claim 1, wherein the vertical planes containing, respectively, said terminal edges and the edges of said upper flange portions are in close juxtaposition.

References Cited in the file of this patent
UNITED STATES PATENTS

| | | |
|---|---|---|
| D. 163,339 | Thompson | May 15, 1951 |
| 2,199,036 | Best | Apr. 30, 1940 |
| 2,326,533 | Greig | Aug. 10, 1943 |
| 2,332,377 | Haltenberger | Oct. 19, 1943 |
| 2,637,592 | Karlby | May 5, 1953 |
| 2,797,953 | Barenyi | July 2, 1957 |
| 2,886,373 | Barenyi | May 12, 1959 |
| 2,953,409 | Barenyi | Sept. 20, 1960 |
| 3,064,747 | Barenyi | Nov. 20, 1962 |
| 3,068,040 | Barenyi | Dec. 11, 1962 |

FOREIGN PATENTS

| | | |
|---|---|---|
| 1,049,109 | France | Aug. 12, 1953 |
| 354,424 | Great Britain | Aug. 13, 1931 |
| 550,603 | Great Britain | Jan. 15, 1943 |
| 700,730 | Great Britain | Dec. 9, 1953 |
| 717,949 | Great Britain | Nov. 3, 1954 |
| 717,951 | Great Britain | Nov. 3, 1954 |
| 846,207 | Great Britain | Aug. 31, 1960 |
| 864,325 | Great Britain | Apr. 6, 1961 |
| 485,482 | Italy | Oct. 13, 1953 |